United States Patent [19]

Meyerand

[11] Patent Number: 4,630,440
[45] Date of Patent: Dec. 23, 1986

[54] PROCESS AND APPARATUS FOR GENERATING ELECTRICAL POWER FROM OCEAN WAVES

[76] Inventor: Mary E. Meyerand, 64 Littel Acres Rd., Glastonbury, Conn. 06033

[21] Appl. No.: 800,279

[22] Filed: Nov. 21, 1985

[51] Int. Cl.[4] ............................................. F03B 13/12
[52] U.S. Cl. ........................................ 60/398; 60/497
[58] Field of Search .................... 60/497, 398; 290/53

[56] References Cited

U.S. PATENT DOCUMENTS

| | | | |
|---|---|---|---|
| 3,353,787 | 11/1967 | Semo | 60/398 |
| 3,989,951 | 11/1976 | Lesster et al. | 290/53 |
| 4,145,882 | 3/1979 | Thorsheim | 60/398 X |

Primary Examiner—Allen M. Ostrager
Attorney, Agent, or Firm—Fishman & Dionne

[57] ABSTRACT

A wave energy power generating process and apparatus is presented which takes advantage of the changing hydrodynamic pressure of ocean waves. The present invention comprises a fluid (preferably a gas) filled constant pressure reservoir positioned on land adjacent the ocean, i.e., the beach, which is connected by a hose or conduit to a submerged wave machine. The submerged wave machine consists of a water filled outer housing and a fluid filled inner flexible bladder. The housing includes at least one opening through a wall thereof communicating with the ocean. The opening includes at least one turbine therein which is connected to an electrical generator. When a wave crest flows above the wave machine, the water pressure over the housing and inner reservoir increases thereby collapsing the bladder. The collapse of the bladder will decrease the volume thereof and provide increased volume for ocean water. As a result, water will flow into the outer housing through the housing opening and gas will flow into the constant pressure reservoir. This incoming water into the housing will flow through the turbine thereby generating electrical power. During a wave trough, the process is reversed whereby hydrostatic pressure on the housing and bladder decrease, thereby increasing the volume of the bladder, forcing water back out of the housing via the opening and through the turbine, thereby generating electricity.

15 Claims, 2 Drawing Figures

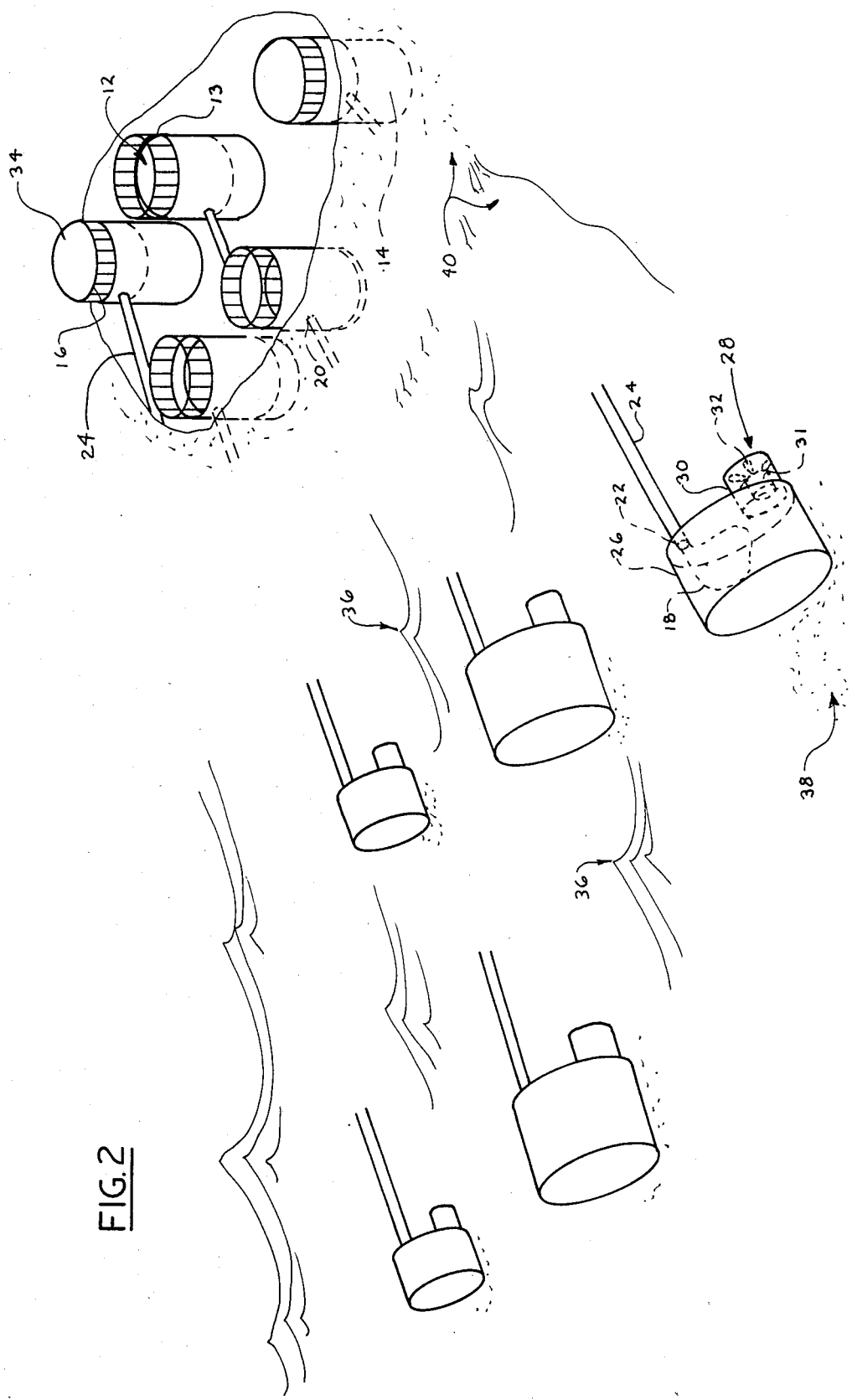

PROCESS AND APPARATUS FOR GENERATING ELECTRICAL POWER FROM OCEAN WAVES

BACKGROUND OF THE INVENTION

This invention relates to an apparatus and process for harnessing energy from ocean waves. More particularly, this invention relates to an apparatus and process for utilizing the changing hydrodynamic pressure of ocean waves to generate electrical power.

It is well known that ocean waves represent a large untapped reservoir of renewable energy sources. However, the technology for harnessing energy derived from ocean waves is still in the very early stages of development and suffers many problems from the standpoint of economical and practical utilization.

By far, the largest number of prior art devices which have attempted to harness energy from ocean waves have involved the use of devices which float or operate on the surface of the ocean to produce a mechanical generator-operating action through gearing or the like as described in Masuda U.S. Pat. No. 3,204,110, or to compress atmospheric air entrapped above the wave crests to operate an air motor driving the electric generator as in Corbett Jr. et al U.S. Pat. No. 3,064,137. Other examples of surface wave energy machines are described in the IEEE spectrum article of September 1979 pages 42-49.

However, such surface based devices suffer from several important problems, chief among those problems is the fact that the turbulent forces from even a moderate sea, let alone a stormy sea, will cause such surface devices to suffer considerable damage or be destroyed. As a consequence, enormous costs are involved due to repair and replacement.

Clearly, a reasonable alternative to surface wave energy devices would be to utilize a device which harnesses the energy from ocean waves and is submerged beneath the ocean so as to avoid the harsh environment at the surface. One such apparatus is described in U.S. Pat. No. 3,353,787 to Semo. In Semo, a closed hydraulic system is presented employing an array of submerged fixed-position tubes extending parallel to a shoreline and having flexible upper surfaces for downward deflection by overhead wave pressure to displace hydraulic fluid into a collecting conduit leading to a shore installation that includes an accumulator. The Semo apparatus also includes a hydraulic motor for generator operation and a return sump at exit to the motor. Return flow of hydraulic fluid to the submerged tubes is intended to occur via the above collecting conduit. A check valve at each tube permits facile egress of fluid from such tube and a restricted port through each check valve is intended to permit slow return flow to each tube for refilling. While a submerged closed-circuit power generating system of the fixed-position flexible-wall fluid-displacement type can have the advantage of allowing the ocean surface to remain unobstructed while at the same time affording a breakwater action for shoreline protection, the practical operability of the Semo apparatus is questionable with respect to displacement of hydraulic fluid by wave-created subsurface pressure variation, as well as with respect to the facile-egress restricted-return flow to and from the tubes imposed by the choked check valves in the Semo system.

Another example of a submerged wave energy power generating device is disclosed in U.S. Pat. No. 3,989,951 to Lesster et al. In Lesster et al, a breakwater apparatus which generates electrical power by extracting energy from sea waves is provided. The apparatus consists of an array of subsurface fixed-position flexible-wall pneumatic bags or cells, and a closed cycle system which reacts to surface wave correlated static pressure variations by expiring compressed gas into a supply header to a generator driving a pneumatic motor while simultaneously expiring return gas in a return header from the motor. Alternate inspirational-expirational operation of individual cells involves use of a supply check valve at each cell, discharging it to the supply header, and a return check valve at each cell, receiving from the return header.

While overcoming some of the problems inherent with the above discussed Semo device, the Lesster et al apparatus also suffers from several disadvantages and deficiencies. For example, the apparatus must be kept absolutely level in the presence of ocean waves or all the air will go to the highest bag resulting in the collapse of the lowest bag. Also, the pressure in the supply duct to the turbine is an average of the highest pressure experienced by the bag. Similarly, the pressure in the return duct is an average of the lowest pressure experienced by the bags. As a result, the efficiency of power generated from any given wave will be relatively low with the Lesster et al apparatus.

Other prior art patents of interest with respect to submerged ocean wave energy devices include U.S. Pat. No. 3,598,505 to Green et al and U.S. Pat. No. 4,145,882 to Thorsheim.

SUMMARY OF THE INVENTION

The above discussed and other problems and deficiencies of the prior art are overcome or alleviated by the wave energy power generating process and apparatus of the present invention. In accordance with the present invention, a closed system, constant pressure apparatus takes advantage of the changing hydrodynamic pressure of ocean waves using a first submerged flexible bladder or reservoir and a second flexible reservoir connected to the first reservoir via a conduit and located on the beach or shore.

More particularly, the present invention comprises a fluid (preferably a gas) filled constant pressure reservoir positioned on land adjacent the ocean, i.e., the beach, which is connected by a hose or conduit to a submerged wave machine. The submerged wave machine consists of a water filled outer housing and a fluid filled inner flexible bladder. The housing includes at least one opening through a wall thereof communicating with the ocean. The opening includes at least one turbine therein which is connected to an electrical generator. When a wave crest flows above the wave machine, the water pressure over the housing and inner reservoir increases thereby collapsing the bladder moving the air to the constant pressure reservoir. The collapse of the bladder will decrease the volume thereof and provide increased volume for ocean water. As a result, water will flow into the outer housing through the housing opening. This incoming water into the housing will flow through the turbine thereby generating electrical power. During a wave trough, the process is reversed whereby hydrostatic pressure on the housing and bladder decrease, thereby increasing the volume of the bladder, forcing water back out of the housing via the opening and through the turbine, thereby generating electricity.

The above discussed and other advantages of the present invention will be apparent to and understood by those skilled in the art from the following detailed description and drawings.

DESCRIPTION OF THE DRAWINGS

Referring now to the drawings, wherein like elements are numbered alike in the several FIGURES:

FIG. 2 is a side elevation view of the wave energy power generating apparatus of FIG. 1 deployed in an ocean.

DESCRIPTION OF THE PREFERRED EMBODIMENT

Figure 1:
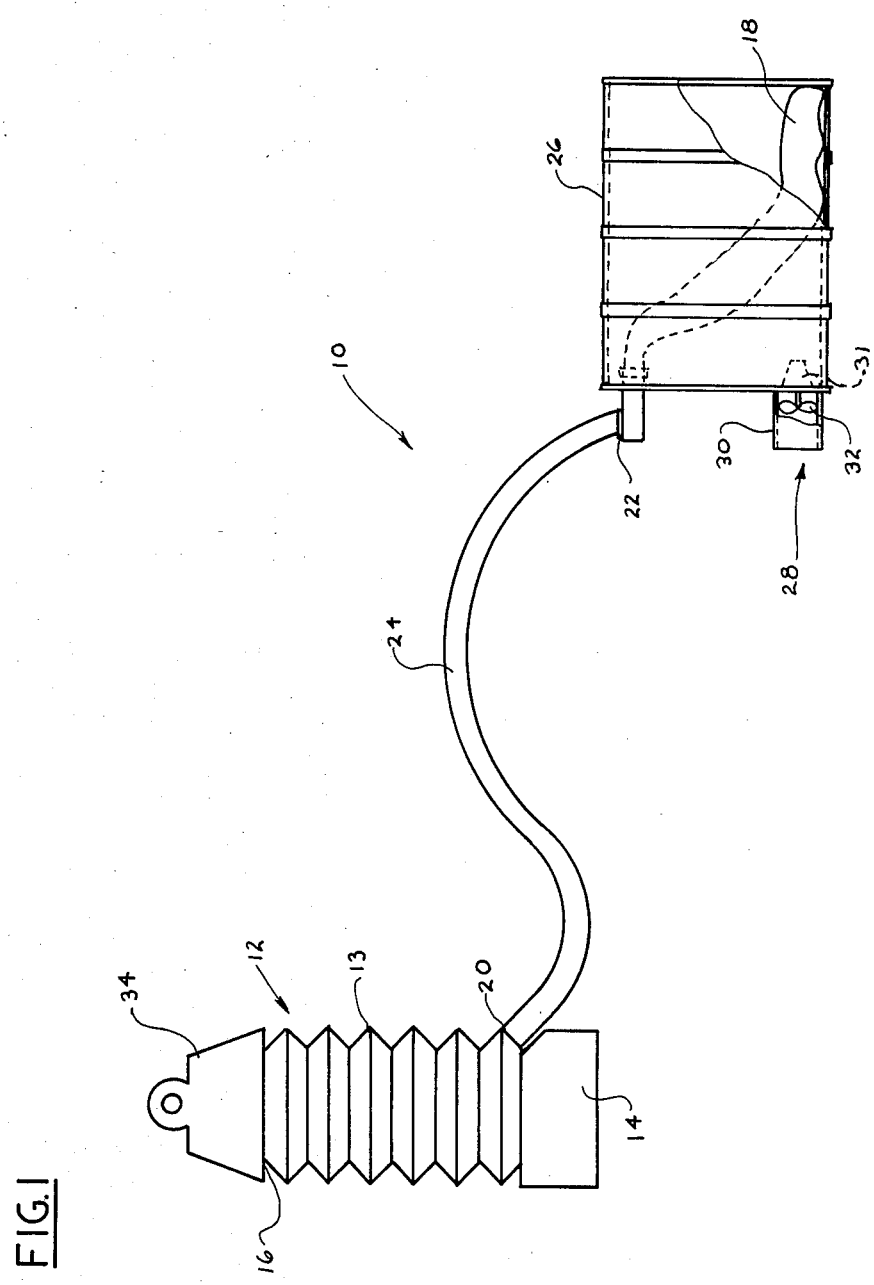
FIG. 1 is a side elevation view of one embodiment of the wave energy power generating apparatus in accordance with the present invention.

Referring first to FIG. 1, a fluid filled constant pressure power generating wave energy apparatus is shown generally at 10. Wave energy apparatus 10 comprises a fluid filled constant pressure reservoir 12 positioned on a base 14 of a container 13, base 14 having upper surface 16. Fluid filled constant pressure reservoir 12 is connected to a second reservoir or flexible bladder 18 via fluid tight connections 20 and 22 through a hose or conduit 24. A housing 26 fully encloses flexible bladder 18 and is provided with at least one opening 28 having a cylindrical shell 30 attached thereto. Cylindrical shell 30 houses a turbine 32 which is connected to a generator 31. As will be discussed more fully hereinafter, a weight 34 is positioned on the top surface 16 of container 13 to provide the proper hydrodynamic balancing of the constant pressure wave energy apparatus.

Turning now to FIG. 2, the power generating wave energy apparatus 10 of FIG. 1 is shown after being deployed in an ocean environment whereby the apparatus may now produce electricity. During operation, housing 26 having flexible bladder 18 therein, and turbine 32 which is attached thereto, is positioned beneath the ocean waves 36 on the floor of the ocean 38. The fluid hose or conduit 24 leads from flexible bladder 18 to the surface of the ocean and out to the perimeter of land surrounding the ocean identified at 40. Fluid or gas hose 24 is connected to constant pressure reservoir 12 and is positioned between the upper surface 16 and base 14 of the upper container or housing 13.

When the crest of an ocean wave passes above submerged housing 26, the hydrostatic pressure on the housing and on flexible bladder 18 increases. As a result, fluid (gas) located within flexible bladder 18 will be forced therefrom through conduit 24 and into constant pressure reservoir 12. This resultant change in volume i.e., decrease of volume in flexible bladder 18 will permit water to flow into cylinder 30 through turbine 32 and into housing 26 to replace the lost bladder volume. During this action, turbine 32 will rotate and thereby generate electricity via a generator. Simultaneously, constant pressure reservoir 12 will be expanded by the fluid incoming from bladder 18 whereupon upper surface 16 will be raised as shown in FIG. 2.

When a trough of a wave passes over housing 26, the reverse sequence of events takes place. Thus, during a trough, the hydrostatic pressure on housing 26 and on bladder 18 will decrease. As a result, in a effort to equalize pressure between bladder 18 and constant pressure reservoir 12, fluid will be forced from reservoir 12 through conduit 24 and into bladder 18. The increased fluid flow into bladder 18 will cause the bladder to expand and thereby force water out from housing 26 through cylinder 30 and past turbine 32. Again, the actuation of turbines 32 will produce electricity via a generator (31) attached thereto. During operation of the present invention, it is important that a weight 34 be provided to surface 16, the weight being approximately equal to the average hydrostatic pressure exerted on housing 26 at the selected depth on the bottom of the ocean.

It will be appreciated that any number of turbines may be used in conjunction with the submerged housing of the present invention.

A significant feature of the present invention is the use of a constant pressure reservoir of fluid which is positioned above the water and connected to a flexible bladder submerged under the water on the ocean floor. Such a constant pressure closed system provides a much higher efficiency relative to prior art devices such as the device described in U.S. Pat. No. 3,989,951 to Lesster et al. As mentioned, in Lesster et al, the pressure in the supply duct to the turbine is an average of the highest pressure experienced by the bags. Likewise, the pressure in the return duct is an average of the lowest pressures experienced by the bags. In the present invention, the highest pressure is the true peak hydrodynamic pressure and the lowest is the true minimum trough hydrodynamic pressure. Therefore, from a fundamental consideration, the ocean wave energy apparatus in accordance with the present invention will generate more power from a given wave at a higher efficiency.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for generating electrical power from ocean waves comprising:
    first housing means adapted for submersion at a selected depth beneath the ocean waves, said first housing means including at least one opening therethrough;
    first flexible bladder means, said first bladder means being disposed within said first housing means;
    electrical generating means being associated with said first housing means opening whereby ocean water flowing through said opening will actuate said electrical generating means;
    constant pressure reservoir means adapted for positioning above said ocean waves;
    conduit means communicating between said first flexible bladder means and said constant pressure reservoir means; and
    a fixed quantity of fluid being disposed within said first bladder means, said constant pressure reservoir means and said conduit means.

2. The apparatus of claim 1 wherein the ocean includes an ocean bottom and wherein:
    said first housing means rests on the ocean bottom.

3. The apparatus of claim 1 wherein said electrical generating means comprises:
    at least one turbine disposed in said first housine means opening; and
    an electrical generator connected to said turbine.

4. The apparatus of claim 3 including:

second housing means attached to said first housing means opening, said turbine being disposed within said second housing means.

5. The apparatus of claim 1 wherein said constant pressure reservoir means comprises:
second flexible bladder means;
means for enclosing said second flexible bladder means; and
means for exerting pressure on said second flexible bladder means, said pressure being approximately equal to the average hydrostatic pressure exerted on said first housing means at the selected depth beneath the ocean waves.

6. The apparatus of claim 5 wherein:
said constant pressure reservoir means is located along the shore of the ocean.

7. The apparatus of claim 1 wherein said fluid comprises a gas.

8. A process for generating electrical power from ocean waves comprising the steps of:
submerging a first housing means at a selected depth beneath the ocean waves, said first housing means including at least one opening therethrough, said first housing means also including first flexible bladder means therein and electrical generating means being associated with said first housing means opening;
positioning constant pressure reservoir means above said ocean waves;
forming a fluid tight communication between said first bladder means and said constant pressure reservoir means;
providing a fixed quantity of fluid within said first bladder means and said constant pressure reservoir means;
urging at least a portion of said quantity of fluid to flow between said first bladder means and said constant pressure reservoir means in conjunction with the changing hydrostatic pressure on said submerged housing means whereby said first bladder means will alternately expand and contract thereby forming water into or out of said first housing means opening thereby actuating said electrical generating means.

9. The process of claim 8 wherein the ocean includes an ocean bottom and including:
resting said first housing means on the ocean bottom.

10. The process of claim 8 wherein said electrical generating means comprises:
at least one turbine disposed in said first housing means opening; and
an electrical generator connected to said turbine.

11. The process of claim 10 including:
attaching second housing means to said first housing means opening; and
disposing said turbine within said second housing means.

12. The process of claim 8 including:
exerting pressure on said constant pressure reservoir means, said pressure being approximately equal to the average hydrostatic pressure exerted on said first housing means at the selected depth beneath the ocean waves.

13. The process of claim 12 wherein:
locating said constant pressure reservoir means along the shore of the ocean.

14. The process of claim 8 wherein said fluid comprises a gas.

15. The process of claim 8 wherein:
said constant pressure reservoir means includes second bladder means, said second bladder means communicating with said first bladder means.

* * * * *